United States Patent Office 2,760,992
Patented Aug. 28, 1956

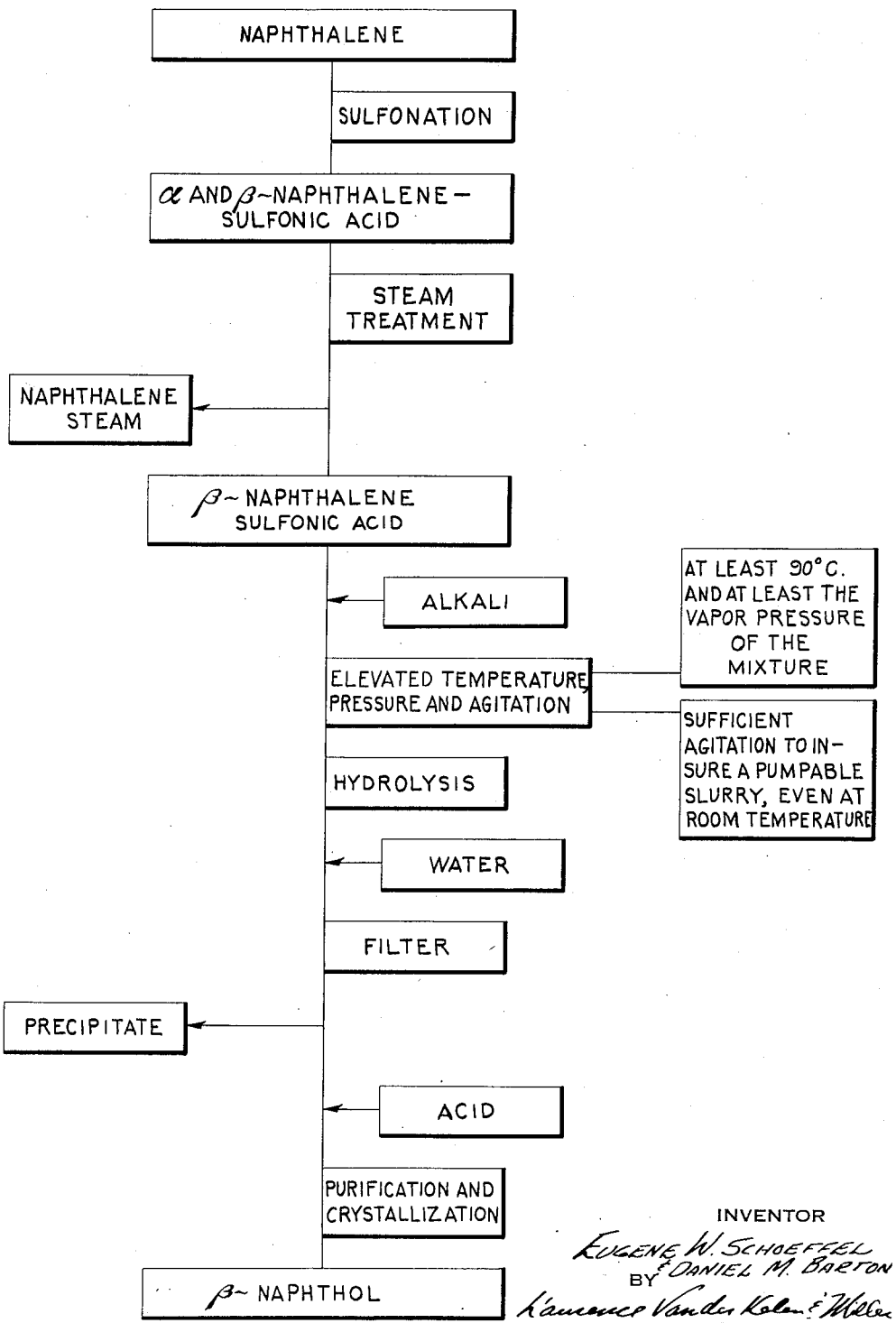

2,760,992

PRODUCTION OF BETA-NAPHTHOL

Eugene W. Schoeffel, and Daniel M. Barton, Kronenwetter, Wis., assignors to Sterling Drug Inc., New York, N. Y., a corporation of Delaware Application July 9, 1953, Serial No. 367,110

8 Claims. (Cl. 260—628)

This invention relates to a method for the preparation of phenolic compounds, particularly to a method for the preparation of beta-naphthol.

Phenolic compounds are generally made on a commercial scale either by the hydrolysis of a sulfonic acid or of a halogen compound, the process involving the replacement of the sulfonic acid radical or of the halogen, respectively, with a hydroxyl group. The replacement of a halogen with hydroxyl, as in the preparation of phenol from monochlorobenzene, is usually carried out by mixing the halogen compound with a sufficient amount of aqueous sodium hydroxide to form sodium phenolate and sodium chloride, slightly more than the theoretically required amounts of alkali generally being employed. The reaction is carried out at an elevated temperature, usually in the neighborhood of 350 degrees centigrade or even somewhat higher, and sufficient agitation of the mixture is used to insure intimate contacting of the two liquid phases. The process is generally carried out in a long, tubular reactor maintained at the reaction temperature and the liquid mixture is forwarded through the tube sufficiently rapidly to cause turbulent flow whereby the two liquid phases are intimately and continuously mixed with one another.

Although the process just mentioned for the production of phenol from monochlorobenzene has been applied to the production of beta-naphthol from beta-chloronaphthalene, the results have not been particularly satisfactory. In part, these unsatisfactory results are due to the difficulty of obtaining beta-chloronaphthalene in sufficient purity to permit the production of pure beta-naphthol. During the chlorination of naphthalene for the production of beta-chloronaphthalene, a considerable proportion of alpha-chloronaphthalene is also formed and the separation of the two chloronaphthalenes is difficult and costly. If the mixture of chloronaphthalenes is submitted to the hydrolysis with alkali without being separated from one another, there is formed a mixture of alpha- and beta-naphthols and the separation of these compounds is likewise difficult and costly.

For these and other reasons, the preparation of beta-naphthol has usually been effected by first sulfonating naphthalene and then replacing the sulfonic acid radical with a hydroxyl group by reaction with an alkali. Although, as in the case of the halogenation of naphthalene, the sulfonation of naphthalene leads to a sulfonation product which contains both alpha-naphthalenesulfonic and beta-naphthalenesulfonic acids, the proportion of the former in the sulfonation mixture is relatively low and the separation of the beta acid in relatively pure form from the mixture can be effected without great difficulty. One convenient way for obtaining beta-naphthalenesulfonic acid substantially free from alpha-naphthalenesulfonic acid comprises blowing steam through the crude sulfonation mixture. Under such conditions, the alpha-naphthalenesulfonic acid is hydrolyzed at a much more rapid rate than is the beta acid, and all of the alpha acid is converted to naphthalene and sulfuric acid before any appreciable quantity of the beta acid is hydrolyzed. A considerable proportion of the naphthalene formed volatilizes with the steam. The residue from the steaming operation contains, besides a certain amount of water, sulfuric acid, naphthalene and other alkali-insoluble substances, a high proportion of beta-naphthalenesulfonic acid, but is substantially free from alpha-naphthalenesulfonic acid.

The conversion of the beta-naphthalenesulfonic acid present in the residue from the steaming operation to beta-naphthol having a satisfactory degree of purity has, however, heretofore presented several operational difficulties. It has been found that, when sufficient sodium hydroxide is added to the mixture to render it alkaline, the sodium beta-naphthalenesulfonate precipitates almost completely due to its rather low solubility in water and the salting-out effect of the sodium sulfate resulting from the neutralization of the sulfuric acid in the solution. This condition is further aggravated when excess alkali is added to the mixture in an attempt to form a strongly alkaline aqueous mixture which can be subjected directly to hydrolysis under pressure to form beta-naphthol. Such strongly alkaline mixtures are so extremely thick that they cannot be pumped and handled, or even stirred with any degree of facility. Excess dilution of the mixture with water not only renders the process uneconomical because of the size of the equipment required, but also because of the reduced rate of hydrolysis of the sodium beta-naphthalenesulfonate in dilute solutions or suspensions.

For these reasons it has been the practice in the past to add a large quantity of water and sufficient alkali to the steam distilled sulfonation mixture to neutralize both the sulfuric acid and the beta-naphthalenesulfonic acid and to then filter the mixture and wash the filter cake to recover the precipitated sodium beta-naphthalenesulfonate. The cake is subsequently dried and fused with sodium hydroxide in non-pressurized kettles in known fashion. This procedure offers considerable difficulty in the filtration of the precipitated sodium beta-naphthalenesulfonate, since it requires the filter cake to be dried and involves difficulties inherent in any alkali fusion process. An undesirably large proportion of the sodium beta-naphthalenesulfonate remains unprecipitated and is lost in the filtrate. The process, furthermore, does not offer any opportunity for separating from the naphthalenesulfonic acid or its sodium salt the alkali-insoluble materials formed during the sulfonation and subsequent steam distillation, so that the fusion process must be carried out with these substances present, unless a separate additional filtration of the diluted highly acid solution is resorted to prior to the alkalization. This necessitates additional purification steps during the isolation of the beta-naphthol from the fusion melt, which, of course, decreases the efficiency and adds to the cost of the process. It is also known that unless the sodium beta-naphthalenesulfonate is purified prior to the fusion operation, the presence in the alkali fusion mixture of the alkali-insoluble and other non-sulfonates remaining in the steamed sulfonic acid mixture leads to excessive decomposition of the beta-naphthalenesulfonate to form substances other than beta-naphthol to such a degree that without the purification step the entire process becomes highly uneconomical. Furthermore, the beta-naphthol obtained is of very poor quality due to the presence therein of the decomposition products which are difficult to remove.

Attempts have been made to mix the steamed sulfonation mixture and the alkali directly in the fusion kettle without any preliminary separation or purification of the beta-naphthalenesulfonic acid or its salt. Such a process, however, gives only an inferior yield of beta-naphthol and does not avoid the necessity of separating alkali-insoluble materials from the beta-naphthol. This modification of the process has been found to be highly unsatisfactory.

Beta-naphthol is being commercially prepared by batch methods although a continuous sulfonation procedure would be more desirable. The reason why no continuous process has been developed is the difficulty of converting the sodium beta-naphthalenesulfonate to beta-naphthol by a continuous method. Our invention is primarily concerned with the method for a continuous operation and production of beta-naphthol with yields approximating 90–95 percent based on the naphthalene used. Following the procedure of our invention, as hereinafter described, laboratory and pilot plant operation has established the feasibility of continuous beta-naphthol production and has concomitantly produced a beta-naphthol of excellent purity and quality.

The accompanying flow sheet, Figure 1, is a diagrammatic representation of the process of the present invention. This flow sheet is for the purpose of illustration only and is not to be construed as limiting the invention thereto. The following description will more adequately point out the specific embodiments and general scope of the process of this invention.

It has now been found that the crude sulfonation mixture, after steaming to decompose alpha-naphthalenesulfonic acid therein, can be treated directly with strong aqueous alkali and the mixture heated under pressure to hydrolyze the beta-naphthalenesulfonate to produce a reaction product from which beta-naphthol having a high degree of purity can be recovered in high yield. The process of the present invention can be carried out without encountering the difficulties in handling referred to in the preceding paragraphs and is characterized particularly by the method of neutralizing and treating the steamed sulfonation mixture as a result of which there is formed a liquid slurry containing a high proportion of a salt of beta-naphthalenesulfonic acid and sufficient alkali to effect rapid and substantially complete hydrolysis thereof. The process is also characterized by the possibility of carrying out the hydrolysis step without the need of any purification step following the steaming step. However, it is apparent that a purified salt of beta-naphthalenesulfonic acid can be used in the process, if desired.

The invention is based, in part, upon the observation that when the steamed sulfonation mixture is mixed directly and without prior dilution with strong aqueous alkali containing enough actual alkali to neutralize both the beta-naphthalenesulfonic acid and residual sulfuric acid in the mixture and to effect hydrolysis of the former under conditions of heat and pressure, and the mixing is carried out under conditions of violent agitation and elevated temperature, there is obtained a thin slurry rather than a thick, semi-rigid curd. This thin slurry can be agitated readily and, upon cooling to below the boiling point of the mixture at atmospheric pressure, and even to as low as ordinary room temperatures, remains so highly fluid that it can be pumped readily and otherwise handled as a liquid using conventional equipment, even though it contains a high proportion of the salts of beta-naphthalenesulfonate. The exact nature of the mixture has not been determined fully and it is not known with certainty whether the phenomenon is due to a change in crystalline structure at the elevated temperature or to some other cause.

Alkalies which can be used to neutralize the steamed beta-naphthalenesulfonic acid mixture are the hydroxides and alkaline-reacting salts of the alkali and alkaline earth metals, such as sodium, potassium, magnesium, calcium and strontium hydroxides, carbonates, sulfites, bicarbonates, bisulfites and the like. In general, any salt can be used which is a salt of an acid which is weaker than beta-naphthalenesulfonic acid and which, in the free form, decomposes to non-acidic constituents, e. g., sulfur dioxide or carbon dioxide. As a matter of feasibility, convenience and economy, alkalies which are compounds of sodium are generally employed and, also as a matter to convenience, the invention will be described with particular reference thereto.

Preferred sodium compounds for use in neutralizing the sulfonic acid mixture are sodium hydroxide and sodium sulfite or bisulfite. The use of sodium hydroxide is advantageous in that there is no evolution of gas during the neutralization and thus no tendency for the mixture to foam is encountered as is the case when a sodium carbonate or sulfite is used. In certain instances, however, the use of sodium sulfite or bisulfite is preferred because the liberated sulfur dioxide can be recovered and used subsequently for acidifying the mixture from the hydrolysis of the sulfonic acid to liberate beta-naphthol therefrom. In such case the aqueous liquor remaining after the separation of the beta-naphthol contains sodium sulfite or bisulfite not only equivalent to the sulfur dioxide added, but also that formed by hydrolysis of the sulfonic acid. The liquor thus contains approximately twice as much sulfite or bisulfite as is required to neutralize the next succeeding batch of beta-naphthalenesulfonic acid and sufficient of the liquor can be used for this purpose without further treatment of any sort. The remainder of the liquor can be discarded or treated for recovery of sulfur dioxide or sodium sulfite or bisulfite as desired. Such cyclic processes employing sodium sulfite recovered from the beta-naphthalenesulfonic acid mixture are known although not according to the method of, or under the conditions of, the present invention.

The sodium hydroxide solution used can contain as much as 55 to 60 percent actual sodium hydroxide, the commercial 35 or 50 percent solutions being generally used as a matter of convenience. Less concentrated alkali solutions can also be used, if desired, but solutions containing less than about 25 percent sodium hydroxide are preferably avoided because of the undesirable dilution of the sodium salt which results. It is to be noted that the neutralized mixture contains not more than about 50 to 55 percent by weight of water and that it is exceedingly remarkable that such a mixture, in which the sodium beta-naphthalenesulfonate is practically all in solid form, is sufficiently fluid to be handled in ordinary pumping equipment. It is essential for the successful operation of the present procedure that the mixing of the steamed acid material and alkali be conducted at temperatures above ninety degrees centigrade, preferably at 140 to 160 degrees centigrade. Pressure, which is usually the vapor pressure of the reaction mixture, is also employed, it being critical that the pressure be at least ten pounds per square inch gauge, and is preferably above about thirty pounds per square inch gauge. Vigorous agitation must also be employed, to insure complete contact of the reactants as well as maintain the suspension. It should also be noted that, when the steamed and cooled sulfonation mixture and the sodium hydroxide solutions are mixed at ordinary room or at autogenous temperatures at atmospheric pressure and in proportions to produce a neutral mixture, the mixture becomes so thick that it is virtually impossible to stir it, much less to circulate it through pipes with ordinary pumping equipment.

The invention also depends in part upon the observation that, when employing the modified neutralization procedure just described and heating the alkaline mixture in a closed reactor at an elevated temperature, the hydrolysis of the sulfonate proceeds rapidly and is not unduly influenced as to either yield or quality of the product obtained by the presence therein of either the alkali-insoluble matter formed during the sulfonation, or of the sodium sulfate formed by neutralization of the sulfuric acid in the sulfonation mixture. This result is not to be expected in view of the adverse influences of these substances on the yield and quality of beta-naphthol when the steamed sulfonation mixture is fused directly with alkali without separation of these substances.

Alternatively, the process of the reaction can be carried out using a naphthalenesulfonic acid mixture substantially free of alpha-naphthalenesulfonic acid prepared in any convenient or conventional fashion. One such method includes adding one molecular proportion of naphthalene gradually and with stirring to 1.02 molecular proportion, or slightly more, of 98 percent sulfuric acid and at a temperature of about 160 degrees centigrade and continuing the stirring at the same temperature for some time after all of the naphthalene has been added. Following the heating period, steam is passed through the mixture which is held at about 160 degrees centigrade until hydrolysis of the alpha-naphthalenesulfonic acid is substantially complete. This usually requires from four to eight hours, depending upon the temperature, rate of steaming and other known factors. Alternatively, water equal to about twenty to thirty percent of the weight of the sulfonate can be added and the mixture boiled. The naphthalene is generally sulfonated during the process to the extent of about 97 to 100 percent to form a mixture comprising approximately fifteen percent alpha-naphthalenesulfonic acid and 85 percent beta-naphthalenesulfonic acid. The product, following steam distillation, generally contains about sixty to seventy percent beta-naphthalenesulfonic acid, five to ten percent sulfuric acid, three to five percent naphthalene and other alkali-insoluble materials, often referred as "tars," and 25 to 35 percent water.

The steam distilled sulfonation mixture is then mixed in accordance with the present invention under violent agitation at an elevated temperature and pressure with sufficient strong aqueous sodium hydroxide of 25 to 60 percent, preferably thirty to fifty percent, concentrated to neutralize all the sulfuric and beta-naphthalenesulfonic acids present and to incorporate in the mixture from about 2.0 to about 2.8 moles, preferably about 2.4 moles, of free unreacted sodium hydroxide for each mole of sodium beta-naphthalenesulfonate present. Such a mixture will generally contain from about 45 to about 65 percent of water, including that formed during the neutralization of the sulfuric and beta-naphthalenesulfonic acids. The mixing of the aqueous sodium hydroxide and the sulfonation mixture is carried out in a vessel equipped for heating and vigorous agitation under moderate pressure. One convenient way of effecting the mixing consists in first placing the aqueous sodium hydroxide in the vessel and heating it to a temperature of from about 100 to 150 degrees centigrade. The steamed sulfonation mixture is then pumped into the vessel gradually while the reacting mixture is agitated vigorously and the temperature maintained by appropriate heating or cooling, higher than about 110 degrees centigrade, preferably between about 140 degrees and about 160 degrees centigrade. Vigorous agitation, such as that provided by a high-speed propeller type agitator, is essential during this step of the process. The pressure within the vessel will generally rise to about fifty pounds per square inch gauge or higher, depending upon the temperature.

After all the sulfonation mixture has been added, the alkaline mixture can, if desired, be cooled to somewhat below its boiling point or lower, e. g., to about eighty degrees centigrade for handling under atmospheric pressure, or it can be pumped directly to the hydrolysis vessel without cooling. The mixture thus obtained consists of a highly flowable fluid suspension containing most of the sodium beta-naphthalenesulfonate and other solids in finely divided solid form which shows little or no tendency for solids to settle out upon long standing and which can be pumped and conveyed through pipes readily using conventional centrifugal or displacement pumps. It shows very little tendency to thicken, even after standing for several months at ordinary room temperature. In many respects the mixture resembles an emulsion, although its exact nature has not been determined. Even though a slight thickening may occur, a small amount of agitation at higher temperatures will cause a highly fluid mixture to return.

The beta-naphthalenesulfonic acid and the aqueous alkali can also be introduced into the reaction tower directly provided adequate mechanical mixing is provided.

If the steamed beta-naphthalenesulfonic acid is mixed with the mother liquor from the beta-naphthol conversion the sulfur dioxide or carbon dioxide produced is recycled to the beta-naphthol side for acidification of the sodium beta-naphtholate.

The sodium beta-naphthalenesulfonate produced in this manner can also be pumped directly into the reaction tower together with the aqueous sodium hydroxide for the formation of sodium beta-naphtholate. However, the elevated temperature and pressure mixing with proper agitation is preferable to other methods in that the resulting mixture is stable and sufficiently fluid to be pumped, even though allowed to stand for a considerable period of time.

The hydrolysis step is carried out by heating the fluid alkaline mixture in any convenient apparatus at a temperature of from about 300 to about 370 degrees centigrade. In the preferred procedure the mixture is pumped through a long coil reactor maintained at the proper temperature, although the reaction can be carried out conveniently in any other type of autoclave. During the reaction the pressure increases to about 2400 pounds per square inch or higher, depending upon the actual temperature employed. The period of heating required is dependent in great measure upon the actual temperature employed. Thus, at a reaction temperature of about 360 degrees centigrade, it is generally desirable to heat the mixture for about two hours, whereas at 370 degrees centigrade the hydrolysis is substantially complete in one hour or less. On the other hand, if a reaction temperature of about 300 degrees centigrade is employed it is frequently desirable to continue heating in excess of ten to fourteen hours. Generally speaking, a reaction temperature in the neighborhood of 360 to 370 degrees centigrade is preferable because of a shorter time required to carry the hydrolysis to substantial completion. During the hydrolysis reaction a small amount of the beta-naphthalenesulfonic acid is converted to naphthalene and there are pressures encountered which are frequently somewhat higher than would be expected from a consideration only of the vapor pressure of the reaction mixture.

Following the removal of the hydrolyzed mixture from the hydrolysis vessel it is diluted with water while still warm, e. g., while the temperature is between about fifty and ninety degrees centigrade, cooled to about ordinary room temperature and filtered. The residue remaining on the filter consists, after washing with a small amount of water which is added to the filtrate, of a minor amount of alkali-insoluble matter of which more than fifty percent is usually naphthalene. The latter can be recovered and returned to the sulfonation step of the process. The filtrate contains the excess sodium hydroxide present in the reaction mixture, sodium sulfate, the sodium salt of beta-naphthol and sodium sulfite formed by the hydrolysis of the sodium beta-naphthalenesulfonate. The filtrate may also contain a certain amount of unreacted sodium beta-naphthalenesulfonate. The amount of the latter depends in large measure upon the conditions under which the hydrolysis was carried out. Generally speaking, it is advisable to continue the hydrolysis until the amount of non-hydrolyzed sodium beta-naphthalenesulfonate is as low as possible consistent with economic operation. An amount of unreacted material less than four or five percent of the original sodium beta-naphthalenesulfonate charged into the hydrolysis system can be reached without difficulty. In this way, a continuity of operation is obtained which is not possible in prior art fusion procedures.

The filtrate from the crude hydrolysis mixture can be treated in the usual manner to recover beta-naphthol therefrom. One convenient way consists in neutralizing it by treating it with gaseous sulfur dioxide until the mixture is at about pH 7. The use of sulfur dioxide for the neutralization is advantageous in that it maintains strongly reducing conditions in the mixture and thus leads to a beta-naphthol product of superior color. Other acids, such as acetic, carbonic, formic, propionic, sulfuric, hydrochloric and phosphoric acids can, however, be used, if desired. The acidified mixture is then preferably heated until the beta-naphthol which has been liberated in free form by the acid is melted. This usually occurs at about 90 to 97 degrees centigrade. The hot mixture is then stirred and cooled to granulate the beta-naphthol, e. g., to form pellets about 1/16 to 1/8 inch in diameter, and the cooled mixture filtered and the precipitate washed with water. The precipitate consists of beta-naphthol mixed with a small proportion, usually from about two to five percent by weight, of inorganic salts and water. The product melts at 115–125 degrees centigrade.

Alternatively, the post-fusion product can be neutralized while hot and most of the beta-naphthol removed as a liquid since it floats on top of the concentrated salt solution. The soluble beta-naphthol remaining in the aqueous phase can be recovered by cooling and filtration or can be extracted by a suitable solvent.

The filtrate contains the sodium sulfate and sodium sulfite and any unreacted sodium beta-naphthalenesulfonate.

The crude beta-naphthol obtained from the filtration step can be purified further to free it from inorganic salts by heating and stirring it with water until the beta-naphthol liquifies. As before, this usually occurs at a temperature of from about 90 to 97 degrees centigrade. Vigorous stirring is continued and the mixture cooled slowly, usually to a temperature of 20 to 25 degrees centigrade, to solidify and granulate the beta-naphthol. This mixture is then filtered. The filtrate, which may contain about 0.1 percent by weight of beta-naphthol and approximately 0.2 percent by weight of inorganic salts can be discarded or used as makeup water in previous steps in the process to conserve the beta-naphthol therein. Alternatively, the filtrate can be combined with the filtrate obtained by neutralizing the alkaline hydrolysis mixture and the combined filtrates evaporated to produce a concentrated solution of the inorganic salts present and the mixture then cooled and filtered, or extracted with a suitable solvent. The residue retained on the filter contains both beta-naphthol and sodium beta-naphthalenesulfonate and can be returned to the process prior to the hydrolysis step.

The granulated product, after purification, consists of white essentially pure beta-naphthol which, when dried, has a melting point of 121–123 degrees centigrade. The product can be dried in any convenient way, e. g., under reduced pressure at about eighty degrees centigrade. The yield of pure beta-naphthol is generally at least about 90 to 95 percent of the theoretical amount based upon the amount of beta-naphthalenesulfonic acid in the steamed acid mixture used.

Certain advantages of the invention are apparent from the following example which is given for purposes of illustration only and is not to be construed as limiting.

Example

A quantity of naphthalene was sulfonated in conventional manner and the sulfonation mixture treated with live steam until substantially all of the alpha-naphthalenesulfonic acid had been converted to naphthalene. The sulfonation mixture which was thus obtained contained 63 percent of beta-naphthalenesulfonic acid, 7.7 percent of sulfuric acid, 2.2 percent of alkali-insoluble material and 27.1 percent of water.

Two-hundred and thirty-six grams of fifty percent aqueous sodium hydroxide and 101 grams of water were placed in a pressure vessel equipped for vigorous agitation and heating. The contents of the vessel were heated to about 140 degrees centigrade and 261 grams of the sulfonated mixture described in the preceding paragraph was pumped slowly into the vessel while agitating the contents of the vessel vigorously. The temperature rose rapidly within the vessel to about 150 degrees centigrade and was maintained between 140 degrees and 160 degrees centigrade by appropriate cooling. After all of the sulfonation mixture had been added, the contents of the vessel were agitated vigorously for a few minutes longer and then cooled slowly to about eighty degrees centigrade under only moderate agitation. The mixture thus obtained weighed 598 grams and was in the form of a light tan colored, slightly thickened liquid suspension which upon cooling to room temperature showed no tendency to settle or thicken appreciably. The suspension was of a consistency entirely suitable for pumping in any ordinary displacement or centrifugal pump.

The suspension was then placed in a vessel equipped for high internal pressure and agitation and heated at about 360 degrees centigrade for one hour. The total elapsed time required to bring the reaction vessel up to temperature and cool it after heating was 2.25 hours.

The liquid mixture was then withdrawn from the reaction vessel, diluted with 925 milliliters of water and filtered. The residue on the filter was washed carefully with 100 milliliters of water and the washing added to the main filtrate. The washed residue remaining on the filter weighed 9.5 grams after drying in the air and contained considerably more than fifty percent by weight of naphthalene.

The filtrate obtained was then stirred and sulfur dioxide gas was passed into the solution until the beta-naphthol had precipitated and the mixture was at pH 7. Thirty-two grams of sulfur dioxide was required. The mixture was then heated to 93 degrees centigrade at which temperature the beta-naphthol had melted and was in the form of a water-immiscible liquid. Rapid agitation of the mixture was continued while it was cooled slowly to about 25 degrees centigrade. The beta-naphthol crystallized during the cooling in the form of hard pellets having an average diameter of about 1/16 inch. The mixture was then filtered and the beta-naphthol was washed on the filter with 200 milliliters of water. Washings were added to the filtrate. A sample of the beta-naphthol melted at 115–125 degrees centigrade after drying.

The wet beta-naphthol recovered from the filter was stirred with 1500 milliliters of water and the mixture heated at 93 degrees centigrade to melt the beta-naphthol. The mixture was then cooled slowly with vigorous agitation and the solidified granular beta-naphthol was again recovered by filtering and washing with 200 milliliters of water. The washings were added to the main filtrate.

The beta-naphthol thus obtained was dried at about eighty degrees centigrade in vacuo. There was thus obtained 100 grams of beta-naphthol having a light pink color and melting at 121–123 degrees centigrade. The yield of beta-naphthol was 91.5 percent of the theoretical amount based on the beta-naphthalenesulfonic acid contained in the 261 grams of sulfonation mixture used.

The two filtrates from the crystallized beta-naphthol were combined and evaporated to a volume of 750 milliliters. This concentrated solution was cooled to 25 degrees centigrade and filtered. The precipitate was washed with a small amount of cold water and dried at 130 degrees centigrade. There was thus obtained 3.2 grams of recovered sodium beta-naphthalenesulfonate. Recalculation of the yield of beta-naphthol on the basis of the sodium beta-naphthalenesulfonate actually consumed gave a value of 94 percent of the theoretical amount.

The filtrate from the recovered sodium beta-naphthalenesulfonate had a volume of a little over 700 milliliters and contained 76 grams of sodium sulfite and 36 grams of sodium sulfate. The liquid was substantially free of organic substances other than a trace of beta-naphthol and of sodium beta-naphthalenesulfonate and was of suitable composition for recovery therefrom of the sodium sulfite.

In a manner similar to that of the foregoing example, other alkali hydroxides, such as, for example, potassium hydroxide and lithium hydroxide may be substituted for the sodium hydroxide thereof.

Various modifications may be made in the process and compounds of the present invention without departing from the spirit or scope thereof and it is to be understood that we limit ourselves only as defined in the appended claims.

We claim:

1. In a method for producing beta-naphthol wherein naphthalene is first sulfonated with sulfuric acid and the sulfonate steamed to form an acid mixture comprising essentially beta-naphthalenesulfonic acid, sulfuric acid and water and the acid mixture subsequently mixed with strong aqueous metal hydroxide to form an alkaline mixture and the latter heated to convert the resulting beta-naphthalenesulfonic acid salt to beta-naphthol, the step which includes: mixing the acid mixture and the strong aqueous alkali metal hydroxide at a temperature of at least ninety degrees centigrade and a pressure of at least the vapor pressure of the reaction mixture and in the presence of sufficient vigorous agitation to cause a thin slurry of alkaline mixture to be prepared.

2. The method of claim 1 wherein the acid mixture and the strong aqueous alkali metal hydroxide are mixed at a temperature between about 140 degrees and about 160 degrees centigrade.

3. The method of claim 1 wherein the strong aqueous alkali metal hydroxide contains between about 30 and about 55 percent by weight of hydroxide.

4. The method of claim 1 wherein the strong aqueous alkali metal hydroxide contains at least two moles of hydroxide for each mole of sulfuric acid and of beta-naphthalenesulfonic acid salt.

5. The method for preparing an aqueous mixture comprising from about ten to about 35 parts by weight of sodium beta-naphthalenesulfonate as a suspension characterized by a high degree of fluidity and freedom from settling of solids upon prolonged standing, which includes the step of mixing together under sufficient vigorous agitation to cause preparation of a thin slurry of alkaline mixture, beta-naphthalenesulfonic acid salts, sodium hydroxide and water at a temperature above about 140 degrees centigrade and under a pressure at least equivalent to the vapor pressure of the mixture.

6. In a method for producing beta-naphthol by the alkaline hydrolysis of sodium beta-naphthalenesulfonate, the steps which include: reacting beta-naphthalenesulfonic acid salts with strong aqueous sodium hydroxide while vigorously agitating the mixture at a temperature of at least about 140 degrees centigrade and under at least the vapor pressure of the mixture to form a highly fluid alkaline mixture containing sodium beta-naphthalenesulfonate and at least about two moles of unreacted sodium hydroxide for each mole of sodium beta-naphthalenesulfonate therein; and heating the alkaline mixture under pressure to convert the sodium beta-naphthalenesulfonate to sodium beta-naphtholate.

7. A method for producing beta-naphthol by the alkaline hydrolysis of a salt of beta-naphthalenesulfonic acid, the steps which include: mixing a reaction component containing beta-naphthalenesulfonic acid, sulfuric acid and water with strong aqueous alkali metal hydroxide using sufficient vigorous agitation to cause a thin slurry, a temperature of at least ninety degrees centigrade and a pressure of at least the vapor pressure of the mixture; introducing the resulting suspension into a reaction zone maintained at a temperature between about 300 and about 370 degrees centigrade for a period of time sufficient to substantially completely hydrolyze the beta-naphthalenesulfonic acid salts to beta-naphthol; and, separating beta-naphthol from the resulting reaction mixture.

8. A continuous method for the production of beta-naphthol which includes: continuously mixing a reaction component containing beta-naphthalenesulfonic acid, sulfuric acid and water with strong aqueous alkali metal hydroxide using sufficient vigorous agitation to cause preparation of a thin slurry, a temperature of at least ninety degrees centigrade, and a pressure of at least the vapor pressure of the mixture; continuously introducing the resulting suspension into a reaction zone maintained at a temperature between about 300 and about 370 degrees centigrade for a period of time sufficient to substantially completely hydrolyze the beta-naphthalenesulfonic acid salts to beta-naphthol; and, separating beta-naphthol from the resulting reaction mixture.

References Cited in the file of this patent

UNITED STATES PATENTS

| 1,922,813 | Masters | Aug. 15, 1933 |

FOREIGN PATENTS

| 649,945 | Great Britain | Feb. 7, 1951 |